(12) United States Patent
Yamamoto et al.

(10) Patent No.: US 8,903,203 B2
(45) Date of Patent: Dec. 2, 2014

(54) OPTICAL WAVEGUIDE DEVICE AND METHOD OF MANUFACTURING THE SAME

(75) Inventors: Takanori Yamamoto, Nagano (JP);
Kenji Yanagisawa, Nagano (JP);
Kazunao Yamamoto, Nagano (JP);
Hideki Yonekura, Nagano (JP)

(73) Assignee: Shinko Electric Industries Co., Nagano-shi (JP)

( * ) Notice: Subject to any disclaimer, the term of this patent is extended or adjusted under 35 U.S.C. 154(b) by 679 days.

(21) Appl. No.: 12/946,198

(22) Filed: Nov. 15, 2010

(65) Prior Publication Data

US 2011/0129182 A1    Jun. 2, 2011

(30) Foreign Application Priority Data

Nov. 30, 2009   (JP) .................................. 2009-271837

(51) Int. Cl.
*G02B 6/12* (2006.01)
*G02B 6/43* (2006.01)
*G02B 6/42* (2006.01)
*G02B 6/138* (2006.01)

(52) U.S. Cl.
CPC ........ *G02B 6/43* (2013.01); *G02B 2006/12104* (2013.01); *G02B 6/4214* (2013.01); *G02B 6/138* (2013.01)
USPC ............. 385/14; 385/129; 385/130; 385/131; 385/132

(58) Field of Classification Search
CPC .................. G02B 6/4214; G02B 6/43; G02B 2006/12104; G02B 6/4246; G02B 6/136; G02B 6/423; G02B 6/10; G02B 6/22; G02B 6/132; G02B 6/02; H05K 1/0274; H05K 2201/09909; H01L 321/0264; H01L 31/028; C08F 2/48

USPC ............................................ 385/14, 129–132
See application file for complete search history.

(56) References Cited

U.S. PATENT DOCUMENTS 7,050,691 B2 *   5/2006   Ishizaki et al. ................ 385/132
7,091,057 B2 *   8/2006   Gan et al. ........................ 438/48

(Continued)

FOREIGN PATENT DOCUMENTS

JP         09-214003         8/1997
JP         2002-365457 A1    12/2002

(Continued)

OTHER PUBLICATIONS

Office Action from Japanese Patent Office mailed Feb. 19, 2013 in counterpart application No. 2009-271837 with English translation (10 pages).

*Primary Examiner* — Kaveh Kianni
*Assistant Examiner* — Guy Anderson
(74) *Attorney, Agent, or Firm* — Kratz, Quintos & Hanson, LLP

(57) ABSTRACT

An optical waveguide device includes a wiring substrate, an optical waveguide bonded on the wiring substrate and having a light path conversion inclined surface on both ends, and a light path conversion mirror formed to contact the light path conversion inclined surface of the optical waveguide and formed of a light reflective resin layer or a metal paste layer. In case the light reflective resin layer is used as the light path conversion mirror, the light reflective resin layer may be formed partially only on the side of the light path conversion inclined surface, or may be formed on the whole of the wiring substrate to coat the optical waveguide.

1 Claim, 10 Drawing Sheets

(56) References Cited

U.S. PATENT DOCUMENTS

| | | | |
|---|---|---|---|
| 8,369,675 B2 * | 2/2013 | Yanagisawa | 385/130 |
| 2006/0215982 A1 * | 9/2006 | Umezawa | 385/146 |
| 2008/0131050 A1 * | 6/2008 | Yanagisawa | 385/14 |
| 2009/0016671 A1 * | 1/2009 | Asai et al. | 385/14 |
| 2009/0065132 A1 | 3/2009 | Yamamoto | |
| 2009/0190878 A1 * | 7/2009 | Yanagisawa | 385/14 |
| 2010/0061679 A1 | 3/2010 | Hayashi et al. | |
| 2010/0065309 A1 * | 3/2010 | Shioda | 174/256 |
| 2010/0142904 A1 * | 6/2010 | Yanagisawa | 385/131 |
| 2011/0243495 A1 * | 10/2011 | Nakashiba et al. | 385/14 |

FOREIGN PATENT DOCUMENTS

| | | | |
|---|---|---|---|
| JP | 2007-156026 | 6/2007 | |
| JP | 2008-033217 | 2/2008 | |
| JP | 2008-134621 A1 | 6/2008 | |
| JP | 2008-250007 A1 | 10/2008 | |
| JP | 2008-299287 | 12/2008 | |
| JP | 2009-063766 | 3/2009 | |
| JP | 02010170118 * | 8/2010 | G02B 6/13 |

* cited by examiner (fragmental enlarged view)

(fragmental enlarged view)

OPTICAL WAVEGUIDE DEVICE AND METHOD OF MANUFACTURING THE SAME

CROSS-REFERENCE TO RELATED APPLICATIONS

This application is based upon and claims the benefit of priority of the prior Japanese Patent Application No. 2009-271837, filed on Nov. 30, 2009, the entire contents of which are incorporated herein by reference.

FIELD

It is related to an optical waveguide device and a method of manufacturing the same.

BACKGROUND

Recently, the development of the backbone network communication line as mainly focusing on the optical fiber communication technology is proceeding steadily, in such a situation, the electric wirings in the information terminal are becoming a bottleneck. Against such background, instead of the conventional electric circuit substrate in which all signal transmissions are made by using the electric signal, the opto-electronic composite substrate (optical waveguide device) of the type that transmits high-speed parts by the light signal has been proposed, in order to compensate the limit of transmission speed of the electric signal.

In the case that the light emitting element and the light receiving element of the surface mounted type are mounted to the optical waveguide, the light path conversion inclined surface that is inclined to intersect with the light propagation direction at an angle of 45° is formed at both ends of the optical waveguide, and then the light path conversion mirror is constructed to contact the light path conversion inclined surface, so that the light path conversion is made.

In Patent Literature 1 (Japanese Laid-open Patent Publication No. 2002-365457), it is set forth that the closed space (the air space, or the like) that is enclosed by the light path conversion inclined surface of the optical waveguide and the substrate is used as the light path conversion mirror.

Also, in Patent Literature 2 (Japanese Laid-open Patent Publication No. 2008-250007), it is set forth that the metal film is formed on the light path conversion inclined surface of the optical waveguide by a deposition, or the like, and is used as the light path conversion mirror.

In Patent Literature 3 (Japanese Laid-open Patent Publication No. 2008-134621), it is set forth that the solder resist film of high reflectance is formed on the printed-wiring board by using a white light-curing/thermosetting resin composition.

In the case where a light reflection is caused by utilizing the space (the air space, or the like)(Patent Literature 1), the space that contacts the light path conversion inclined surface of the optical waveguide must be provided. Therefore, it is feared that a structure of the substrate becomes complicated to bring about an increase in cost.

Also, in the case where a light reflection is caused by forming the metal film on the light path conversion inclined surface of the optical waveguide (Patent Literature 2), it is needed to form the metal film by the vacuum deposition or the sputter method. Therefore, the new production facilities must be introduced into the mounting line, and it is feared that such situation is at a disadvantage in cost.

SUMMARY

According to one aspect discussed herein, there is provided an optical waveguide device, which includes a wiring substrate, an optical waveguide bonded on the wiring substrate, and having a light path conversion inclined surface on both ends; and a light path conversion mirror formed to contact the light path conversion inclined surface of the optical waveguide, and formed of a light reflective resin layer or a metal paste layer.

According to another aspect discussed herein, there is provided a method of manufacturing an optical waveguide device, including bonding an optical waveguide having a light path conversion inclined surface on both ends, on a wiring substrate, and obtaining a light path conversion mirror by forming a light reflective resin layer or a metal paste layer to contact the light path conversion inclined surface of the optical waveguide.

DESCRIPTION OF EMBODIMENTS

Embodiments will be explained with reference to the accompanying drawings hereinafter.

(First Embodiment)

FIGS. 1A to FIG. 3 are sectional views depicting a method of manufacturing an optical waveguide device according to a first embodiment.

Figure 1A:
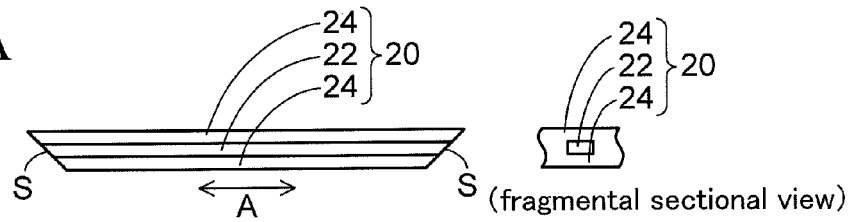
FIGS. 1A to 1C are sectional views (#1) depicting a method of manufacturing an optical waveguide device according to a first embodiment.

In the method of manufacturing the optical waveguide device according to the first embodiment, as depicted in FIG. 1A, first, a wiring substrate 10 and an optical waveguide 20 are prepared. In the wiring substrate 10, through holes TH which penetrate to the thickness direction are provided in an insulation substrate 12 made of a resin, or the like, and a penetration electrode 14 is filled in the through holes TH respectively.

Also, upper connection pads C1 each connected to the penetration electrode 14 are formed on the upper surface side of the insulation substrate 12. Also, lower connection pads C2 each connected to the penetration electrode 14 are formed on the lower surface side of the insulation substrate 12. In this manner, the upper connection pads C1 and the lower connection pads C2 formed on both surface sides of the insulation substrate 12 are connected mutually via the penetration electrode 14 respectively. The upper connection pads C1, the lower connection pads C2, and the penetration electrodes 14 are formed of a metal layer made of copper, or the like.

The upper connection pads C1 and the lower connection pads C2 are connected to the wiring layer, and may be arranged at one end, or may be arranged like an island. Also, internal wiring layers may be formed in the wiring substrate 10. The stacked number of wiring layers of the wiring substrate 10 can be set arbitrarily.

Also, a solder resist 16 in which an opening portion 16a is provided on the lower connection pads C2 respectively is formed on the lower surface side of the insulation substrate 12.

The optical waveguide 20 is constructed by a core portion 22, and cladding portion 24 which is formed to surround the core portion 22 (a fragmental sectional view in FIG. 1A). A refractive index of the core portion 22 is set higher than a refractive index of the cladding portion 24. As the material of the core portion 22 and the cladding portion 24, preferably a fluorinated polyimide resin, a UV curable epoxy resin, a silicone resin, or the like is employed.

Also, a light path conversion inclined surface S which is inclined toward the inside from the upper surface end portion is provided to both ends of the optical waveguide 20. respectively. The light path conversion inclined surface S is inclined to intersect with a light propagation direction A (extending direction of the optical waveguide 20) at an angle of 45°.

Figure 1B:
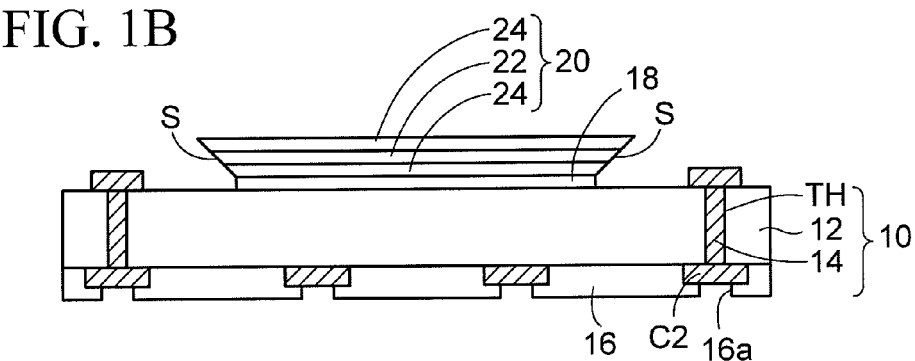

Then, as depicted in FIG. 1B, the cladding portion 24 of the lower side of the optical waveguide 20 is bonded and fixed onto the wiring substrate 10 by an adhesive agent 18. As the adhesive agent 18, a UV curable resin, or the like is employed.

Figure 1C:
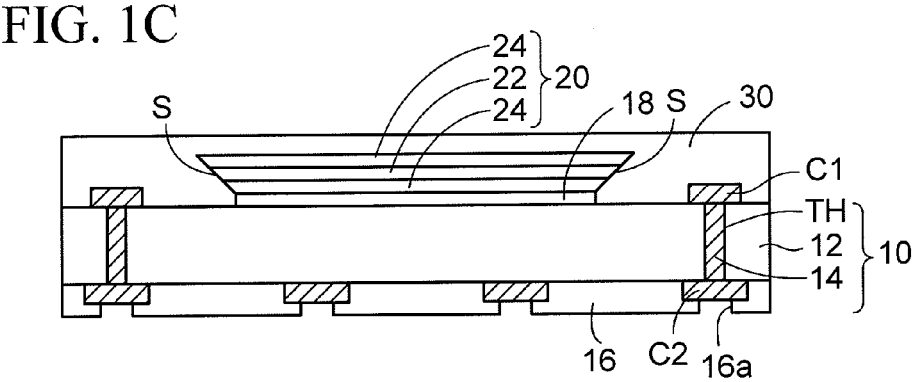

Then, as depicted in FIG. 1C, a liquid light reflective resin material having photosensitivity is formed on the wiring substrate 10 and the optical waveguide 20 by the screen printing, or the like. Then, a light reflective resin layer 30 in a semi-cured state is obtained by the pre-curing (preliminary heating process) the light reflective resin material in a temperature atmosphere of about 150° C.

At this time, the light reflective resin layer 30 is formed such that no clearance is formed between the light path conversion inclined surface S of the optical waveguide 20 and the light reflective resin layer 30, and the light reflective resin layer 30 is formed to contact the whole surface of the light path conversion inclined surface S.

Figure 2A:
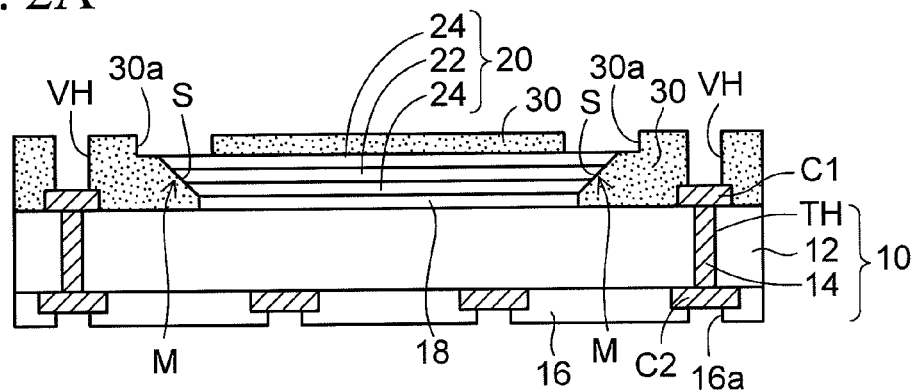
FIGS. 2A to 2C are sectional views (#2) depicting the method of manufacturing the optical waveguide device according to the first embodiment.

Then, as depicted in FIG. 2A, the light reflective resin layer 30 having photosensitivity is exposed/developed on the basis of the photolithography. Accordingly, via holes VH each reaching the upper connection pad C1 on both end sides of the wiring substrate 10 are formed in the light reflective resin layer 30. Simultaneously with this, a light transmitting opening portion 30a is formed in the light reflective resin layer 30 on the light path conversion inclined surface S on both end sides of the optical waveguide 20, and thus the upper cladding layer 24 is exposed.

Further, the light reflective resin layer 30 is cured by applying the main-curing (heating process) in a temperature atmosphere of about 150° C. The light reflective resin layer 30 is formed of white resin that the resin such as epoxy is impregnate with a white pigment such as titanium oxide ($TiO_2$), or the like, and has a high light reflectivity. For example, a light whose wavelength is 850 nm is employed, and a reflectance of 90% or more can be obtained.

Accordingly, the light reflective resin layer 30 which contacts the light path conversion inclined surface S of the optical waveguide 20 functions as a light path conversion mirror M. That is, in the present embodiment, by utilizing the light reflective resin layer 30 as the light path conversion mirror M, a light which propagates through the core portion 22 of the optical waveguide 20 can be converted at the light path conversion inclined surface S by 90°.

Figure 2B:
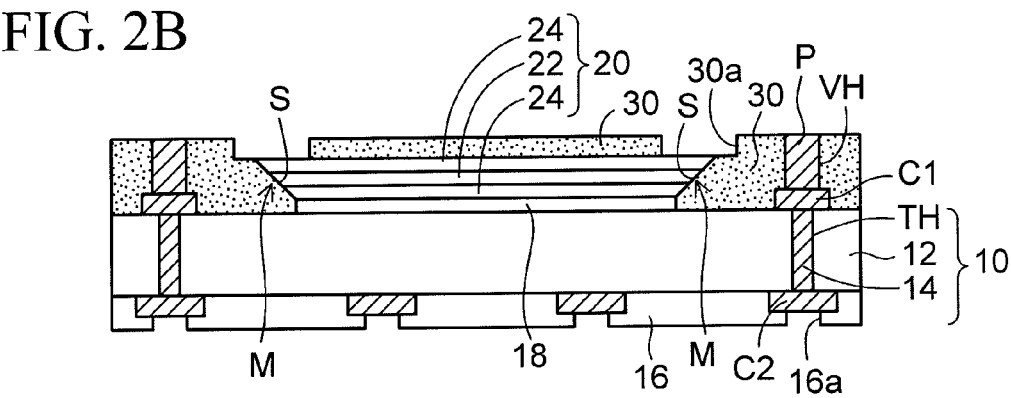

Then, as depicted in FIG. 2B, a copper plating layer is formed from the bottom part to the top part of the via hole VH by the electroplating utilizing a plating power feeding layer (not shown) connected to the upper connection pad C1 as a plating power feeding path. Accordingly, an electrode pad P like a post connected to the upper connection pad C1 is filled in the via holes VH respectively.

At this time, the plating power feeding layer is not present under the light transmitting opening portion 30a of the light reflective resin layer 30. Therefore, a copper plating is not applied to the light transmitting opening portion 30a, and is kept in identical state. The plating power feeding layer (not shown) connected to the upper connection pad C1 is cut off from the upper connection pad C1 later.

Figure 2C:
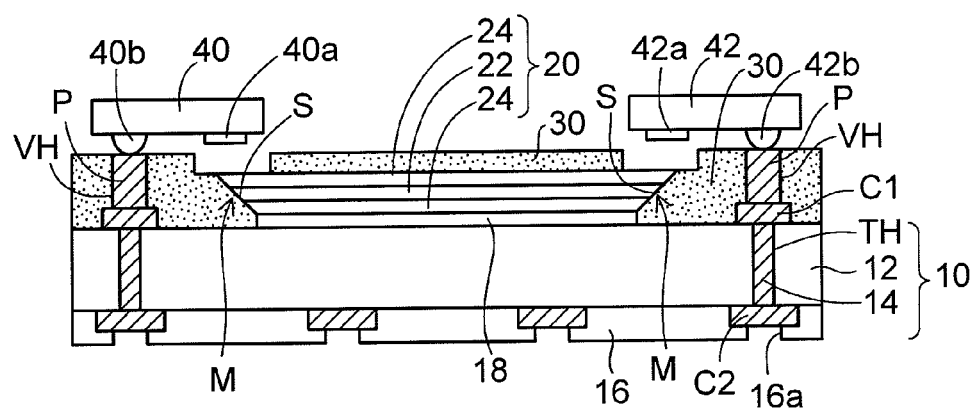

Then, as depicted in FIG. 2C, a light emitting element 40 and a light receiving element 42 are prepared. As the light emitting element 40, preferably a surface emitting laser (VC-SEL: Vertical Cavity Surface Emitting Laser) is employed. Also, as the light receiving element 42, preferably a photo diode is employed.

The light emitting element 40 has a light emitting portion 40a and a connection terminal 40b on the lower surface side. Then, the connection terminal 40b of the light emitting element 40 is connected and mounted onto the electrode pad P on one end side of the wiring substrate 10 in a state that the light emitting portion 40a of the light emitting element 40 is directed downward. At this time, the light emitting portion 40a of the light emitting element 40 is positioned just over the light path conversion inclined surface S of the one end side of the optical waveguide 20. Accordingly, the light emitting element 40 is optically coupled to the light path conversion inclined surface S (the core portion 22) on the one end side of the optical waveguide 20.

Also, the light receiving element 42 has a light receiving portion 42a and a connection terminal 42b on the lower surface side. Then, the connection terminal 42b of the light receiving element 42 is connected and mounted onto the electrode pad P on the other end side of the wiring substrate 10 in a state that the light receiving portion 42a of the light receiving element 42 is directed downward.

At this time, the light receiving portion 42a of the light receiving element 42 is positioned just over the light path conversion inclined surface S of the optical waveguide 20. As a result, the light receiving element 42 is optically coupled to the light path conversion inclined surface S (the core portion 22) on the other end side of the optical waveguide 20.

Although not particularly depicted, a dummy terminal is provided to predetermined end parts of the light emitting element 40 and the light receiving element 42 respectively. Because the dummy terminal is arranged to the light reflective resin layer 30 on the wiring substrate 10, the light emitting element 40 and the light receiving element 42 are mounted without inclination.

Figure 3:
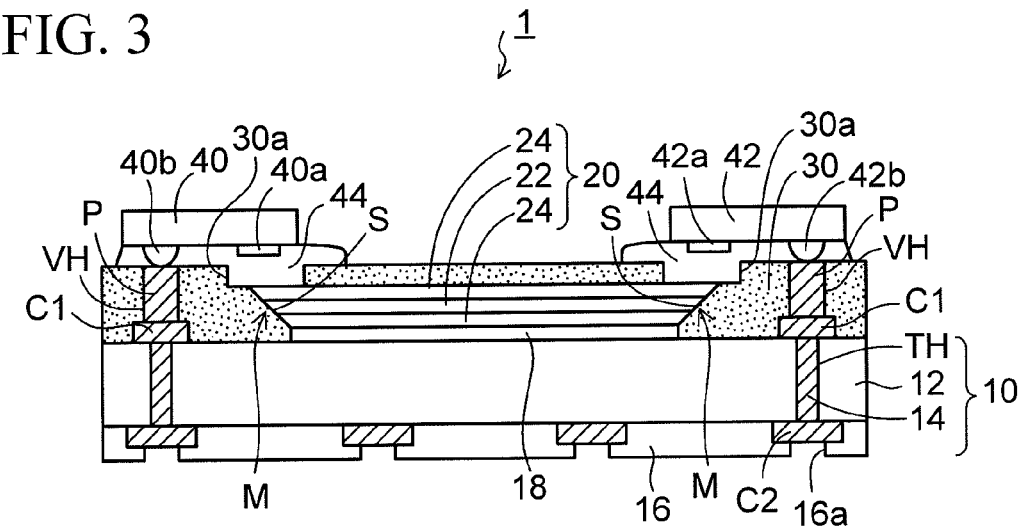
FIG. 3 is a sectional view depicting an optical waveguide device according to the first embodiment.

Then, as depicted in FIG. 3, an underfill resin 44 is filled into a clearance located under the light emitting element 40. Thus, the underfill resin 44 is filled into a clearance between the light emitting element 40 and the bottom surface of the light transmitting opening portion 30a of the light reflective resin layer 30 and a clearance between the light emitting element 40 and the upper surface of the light reflective resin layer 30.

Further, the underfill resin 44 is filled into a clearance located under the light receiving element 42. Thus, the underfill resin 44 is filled into a clearance between the light receiving element 42 and the bottom surface of the light transmitting opening portion 30a of the light reflective resin layer 30 and a clearance between the light receiving element 42 and the upper surface of the light reflective resin layer 30.

As the underfill resin 44, the identical resin with the resin material of the core portion 22 or the cladding portion 24, mentioned above, is employed.

With the above, an optical waveguide device 1 according to the first embodiment is obtained.

As depicted in FIG. 3, in the optical waveguide device 1 according to the first embodiment, the optical waveguide 20 is bonded and fixed onto the wiring substrate 10 having the above structure by the adhesive agent 18. The optical waveguide 20 is constructed with such a structure that core portion 22 is surrounded by the cladding portion 24. The light path conversion inclined surface S which is inclined to intersect with the light propagation direction A (FIG. 1A) at an angle of 45° is provided on both ends of the optical waveguide 20 respectively.

The light reflective resin layer 30 is formed on the side surface and the upper surface of the optical waveguide 20, and the optical waveguide 20 is buried in the light reflective resin layer 30. Then, the light reflective resin layer 30 which contacts the light path conversion inclined surfaces S on both ends of the optical waveguide 20 functions as the light path conversion mirror M respectively. That is, the light path conversion mirror M is formed from the light reflective resin layer 30.

The via holes VH each reaching the upper connection pad C1 on both end sides of the wiring substrate 10 are provided in the light reflective resin layer 30. The electrode pad P formed of a copper plating layer is filled in the via holes VH respectively.

Also, the light transmitting opening portion 30a is provided in the light reflective resin layer 30 on the light path conversion inclined surface S on both ends of the optical waveguide 20 respectively.

The connection terminals 40b of the light emitting element 40 are connected and mounted on the electrode pads P on one end side of the wiring substrate 10 in a state that the light emitting portion 40a of the light emitting element 40 is directed downward. The light emitting element 40 is optically coupled to the light path conversion inclined surface S (the core portion 22) such that the light emitting portion 40a is positioned just over the light path conversion inclined surface S on one end side of the optical waveguide 20.

Also, the connection terminals 42b of the light receiving element 42 are connected and mounted onto the electrode pads P on the other end side of the wiring substrate 10 in a state that the light receiving portion 42a of the light receiving element 42 is directed downward. The light receiving element 42 is optically coupled to the light path conversion inclined surface S (the core portion 22) such that the light receiving portion 42a is positioned just over the light path conversion inclined surface S on the other end side of the optical waveguide 20.

Further, the underfill resin 44 is filled into a clearance located under the light emitting element 40 and the light receiving element 42 respectively.

Figure 4A:
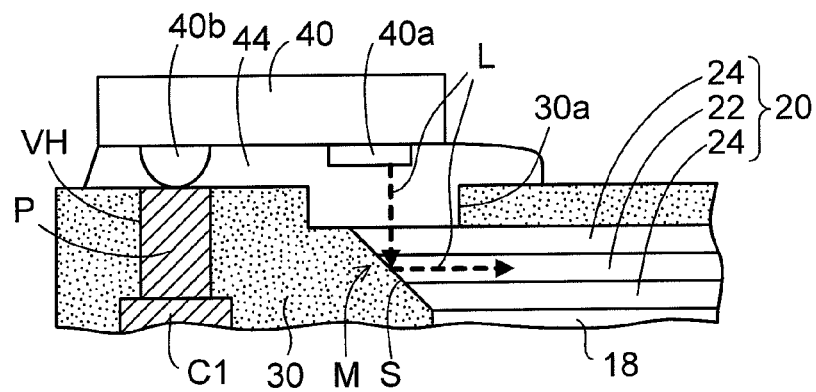
FIGS. 4A and 4B are fragmental enlarged views in which neighborhoods of a light emitting element and a light receiving element in FIG. 3 are enlarged, and which depict a state that a light propagates from the light emitting element to the light receiving element via an optical waveguide.
Figure 4B:
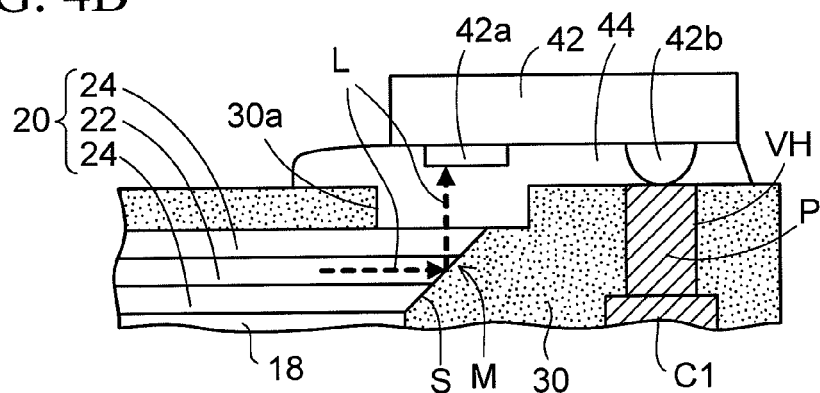

In FIGS. 4A and 4B, a fragmental enlarged view of neighborhoods of the light emitting element 40 and the light receiving element 42 in FIG. 3 is depicted. While referring to FIG. 3 and FIGS. 4A and 4B, it will be explained that a state in which a light is propagated from the light emitting element 40 to the light receiving element 42 through the optical waveguide 20.

As depicted in FIG. 4A, an electric signal being output from a first LSI chip such as CPU, or the like (not shown) mounted on the wiring substrate 10 is supplied to the light emitting element 40, and a light L is emitted downward from the light emitting portion 40a of the light emitting element 40. The light L emitted from the light emitting element 40 passes through the underfill resin 44 formed under the light emitting element 40 (in the light transmitting opening portion 30a of the light reflective resin layer 30), and then reaches the light path conversion inclined surface S on one end side of the optical waveguide 20. Then, the light L which reached the light path conversion inclined surface S is reflected by the light reflective resin layer 30 (the light path conversion mirror M) which contacts the light path conversion inclined surface S, so that the light path is converted by 90° and then the light L enters into the core portion 22.

At this time, the underfill resin 44 is formed by the identical resin with the core portion 22 or the cladding portion 24. Therefore, a reflection of light at the boundary to the optical waveguide 20 can be suppressed to the utmost.

Then, as depicted in FIG. 4B, the light L enters in the core portion 22 propagates while repeating a total reflection in the core portion 22, and reaches the light path conversion inclined surface S on the other end side. Then, the light L is reflected by the light reflective resin layer 30 (the light path conversion mirror M) which contacts the light path conversion inclined surface S on the other end side and thus the light path is converted by 90°. Then, the light L passes through the underfill resin 44 and is entered in the light receiving portion 42a of the light receiving element 42.

The light receiving element 42 converts the light signal into the electric signal, so that the electric signal is supplied to a second LSI chip such as a memory, or the like (not shown) mounted on the wiring substrate 10.

As explained above, in the optical waveguide device 1 of the present embodiment, the light path conversion mirror M provided to contact the light path conversion inclined surface S of the optical waveguide 20 is formed from the light reflective resin layer 30. The light reflective resin layer 30 can be formed easily by using the screen printing machine for forming a resin (solder resist, or the like), that is already equipped in the common mounting line.

Accordingly, unlike the case where the metal film is used as the light path conversion mirror, there is no necessity to introduce particularly the vacuum deposition equipment, the sputtering equipment, or the like. Therefore, a reduction of production cost can be achieved. Also, there is no necessity to form the metal film only on the light path conversion inclined surface, or to provide a space (an air space, an inert gas space, a vacuum space, or the like). Therefore, a structure of the substrate can be made simple, and the steps/man-hours can be reduced.

In addition, the light reflective resin layer 30 has the sufficient light reflecting characteristics, therefore the high-performance optical waveguide device can be constructed.

(Second Embodiment)

FIGS. 5A to 5C and FIGS. 6A to 6C are sectional views depicting a method of manufacturing an optical waveguide device according to a second embodiment.

A feature of the second embodiment resides in that the light reflective resin layer is formed partially only on the side surface of the light path conversion inclined surface S of the optical waveguide 20 as the resin layer portion. In the second embodiment, the same reference symbols are affixed to the same steps and the same elements as those in the first embodiment, and their explanation will be omitted herein.

Figure 5A:
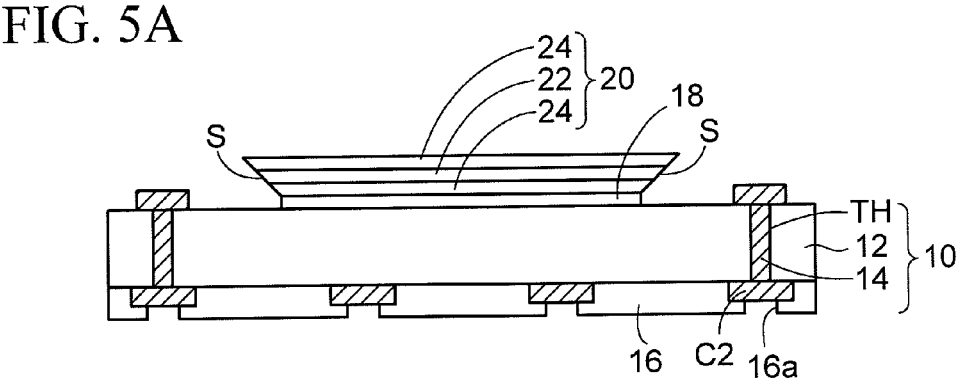
FIGS. 5A to 5C are sectional views (#1) depicting a method of manufacturing an optical waveguide device according to a second embodiment.

As depicted in FIG. 5A, like FIG. 1B in the above first embodiment, the optical waveguide 20 is bonded and fixed onto the wiring substrate 10 by the adhesive agent 18.

Figure 5B:
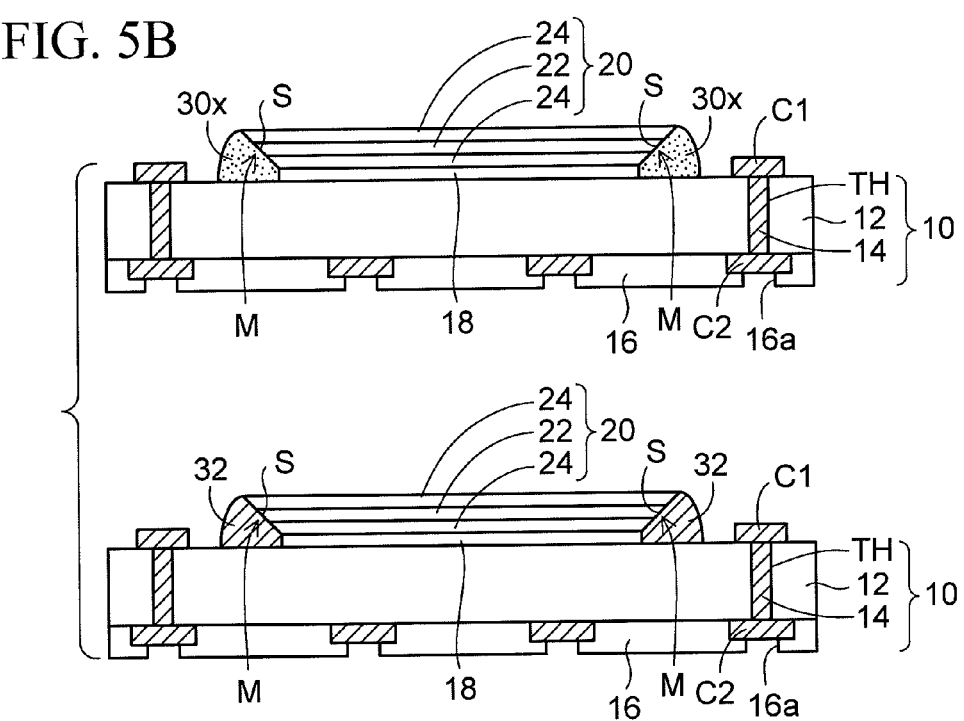

Then, as depicted in an upper drawing of FIG. 5B, the liquid light reflective resin material is formed partially on the side surface of the light path conversion inclined surface S on both ends of the optical waveguide 20 by the dispenser, or the like, and is cured by applying the main-curing (heating process). Accordingly, a light reflective resin layer portion 30x which contacts the light path conversion inclined surface S on both ends of the optical waveguide 20 is formed partially, and functions as the light path conversion mirror M. The light reflective resin layer portion 30x in the second embodiment is formed of the identical white resin with the light reflective resin layer 30 in the first embodiment.

The light reflective resin layer portion 30x can be formed easily by the resin dispenser which is already equipped in the common mounting line.

Otherwise, as depicted in a lower drawing of FIG. 5B, instead of the light reflective resin layer portion 30x, a metal paste layer 32 formed of the metal paste material such as a silver paste, or the like may be employed. That is, the metal paste material is coated partially to the side of the light path conversion inclined surface S on both ends of the optical waveguide 20 by the dispenser, and the metal paste layer 32 is formed by sintering the metal paste material, and the metal paste layer 32 may be utilized as the light path conversion mirror M.

The metal paste material is formed by dispersing the metal particles into the resin such as epoxy resin, or the like. And the metal particles contact each other by sintering the metal paste material, and thus the metal paste layer 32 formed of the metal layer is obtained. The gray/white system metal paste layer 32 such as a silver paste layer, a nickel paste layer, a palladium paste layer, or the like has a high reflectance, and can be preferably utilized as the light path conversion mirror M.

The metal paste layer 32 can be formed easily by using the dispenser that is already equipped in the common mounting line and coats the silver paste, or the like used in mounting.

In the following steps, as depicted in the upper drawing of FIG. 5B, an example in which the light reflective resin layer portion 30x is used as the light path conversion mirror M will be explained hereunder.

Figure 5C:
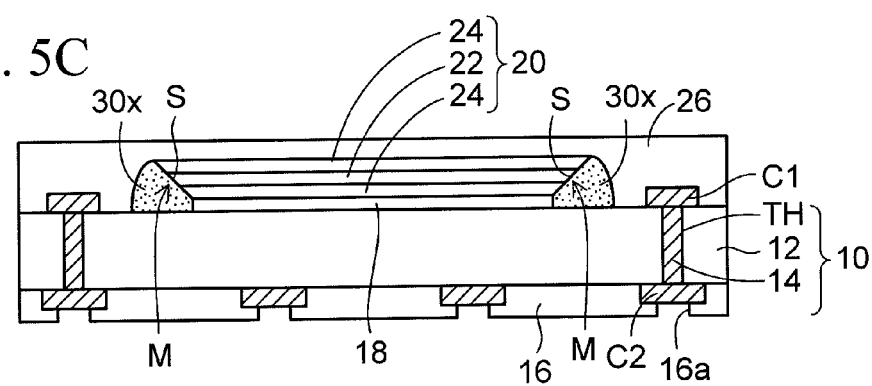
Figure 6A:
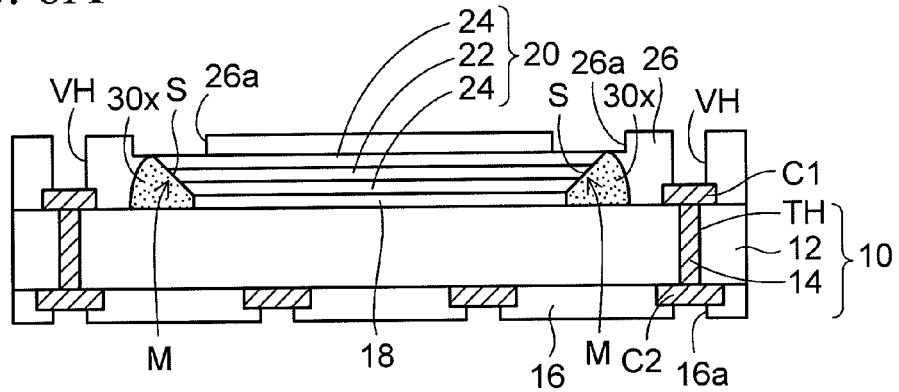
FIGS. 6A to 6C are sectional views (#2) depicting the method of manufacturing the optical waveguide device according to the second embodiment.

Then, as depicted in FIG. 5C, a photosensitive solder resist 26 (insulating resin layer) is formed on the wiring substrate 10 and the optical waveguide 20. Then, as depicted in FIG. 6A, the via holes VH each reaches the upper connection pad C1 on both end sides of the wiring substrate 10 are formed by exposing/developing the solder resist 26.

At this time, simultaneously, a light transmitting opening portion 26a is formed in the solder resist 26 on the light path conversion inclined surface S of the optical waveguide 20. The solder resist 26 is illustrated as the insulating resin layer, but various resin layers can be used.

Figure 6B:
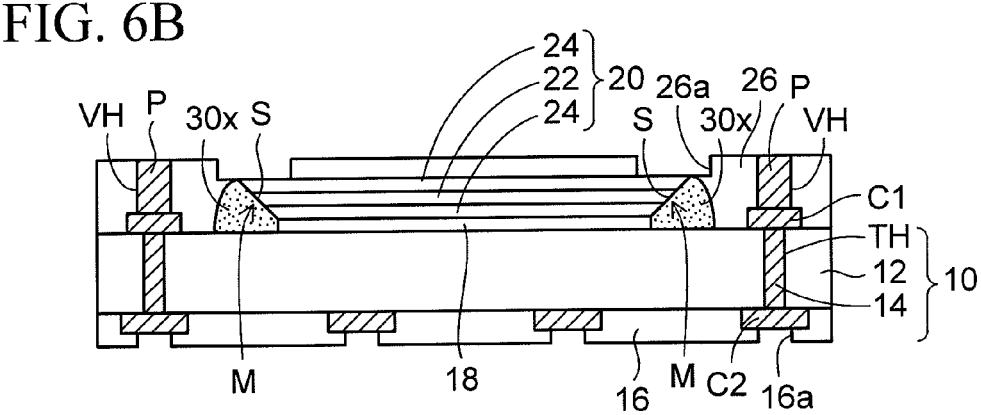

Then, as depicted in FIG. 6B, according to the same method as the first embodiment, a copper plating layer is formed in the via holes VH in the solder resist 26 respectively, and thus the electrode pads P like a post connected to the upper connection pad C1 respectively are obtained.

Figure 6C:
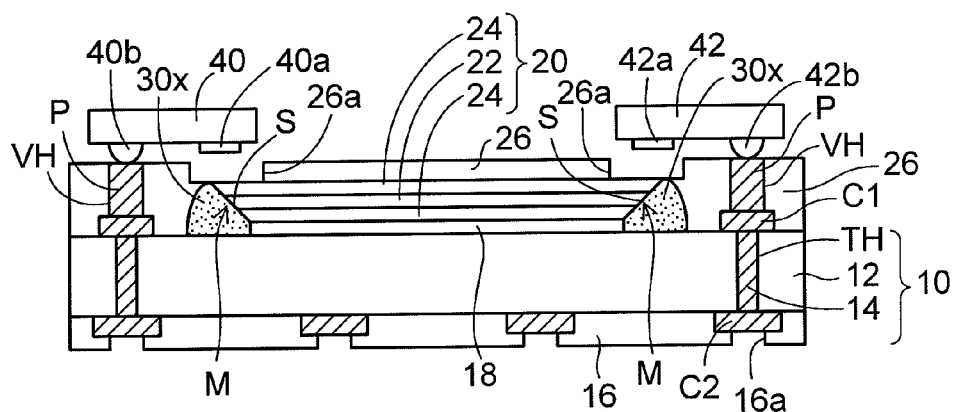

Then, as depicted in FIG. 6C, like the first embodiment, the connection terminals 40b of the light emitting element 40, which is optically coupled to the light path conversion inclined surface S on one end side of the optical waveguide 20, are connected to the electrode pads P on one end side of the wiring substrate 10.

Also, like the first embodiment, the connection terminals 42b of the light receiving element 42, which is optically coupled to the light path conversion inclined surface S on the other end side of the optical waveguide 20, are connected to the electrode pads P on the other end side of the wiring substrate 10.

Figure 7:
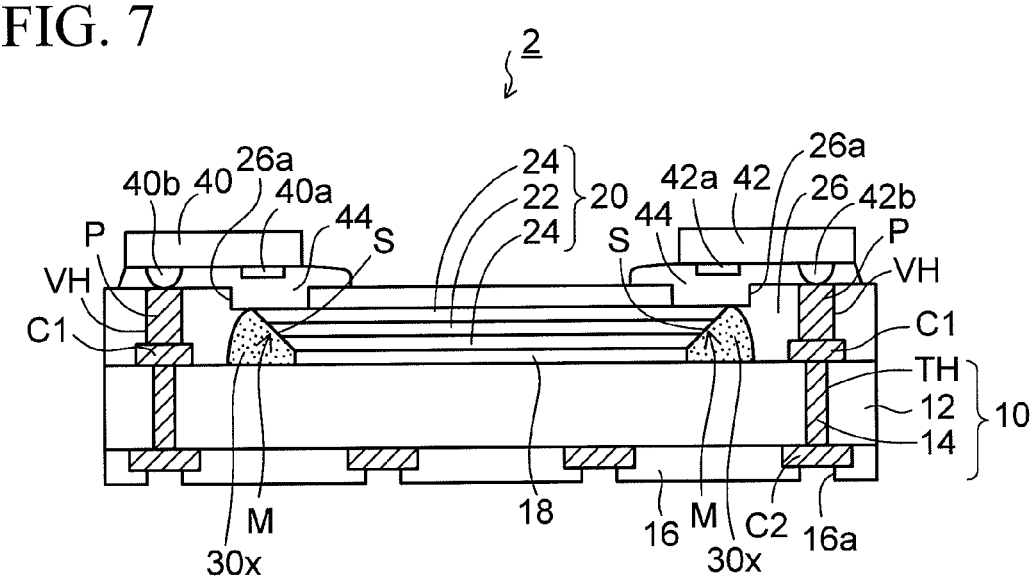
FIG. 7 is a sectional view depicting an optical waveguide device according to the second embodiment.

After this, as depicted in FIG. 7, like the first embodiment, the underfill resin 44 is filled into clearances located under the light emitting element 40 and the light receiving element 42 respectively. The underfill resin 44 is formed of the identical resin with the resin material of the core portion 22 or the cladding portion 24.

With the above, an optical waveguide device 2 of the second embodiment can be obtained.

As depicted in FIG. 7, in the optical waveguide device 2 of the second embodiment, the light reflective resin layer portion 30x is formed partially only on the side surface of the light path conversion inclined surface S of the optical waveguide 20 to contact the light path conversion inclined surface S. Also, the solder resist 26 (insulating resin layer) is formed on the wiring substrate 10 and the optical waveguide 20.

The via holes VH each reaches the upper connection pad C1 on both end sides of the wiring substrate 10 are provided in the solder resist 26 respectively. The electrode pad P is filled in the via holes VH respectively. Also, the light transmitting opening portion 26a is provided in the solder resist 26 located over the light path conversion inclined surface S on both ends of the optical waveguide 20 respectively.

Also, the connection terminal 40b of the light emitting element 40, which is optically coupled to the light path conversion inclined surface S on one end side of the optical waveguide 20, is connected the electrode pad P on one end side of the wiring substrate 10 and is mounted thereon. Also, the connection terminal 42b of the light receiving element 42, which is optically coupled to the light path conversion inclined surface S on the other end side of the optical waveguide 20, is connected the electrode pad P on the other end side of the wiring substrate 10 and is mounted thereon. The underfill resin 44 is filled in the clearances located under the light emitting element 40 and the light receiving element 42 respectively.

Figure 8:
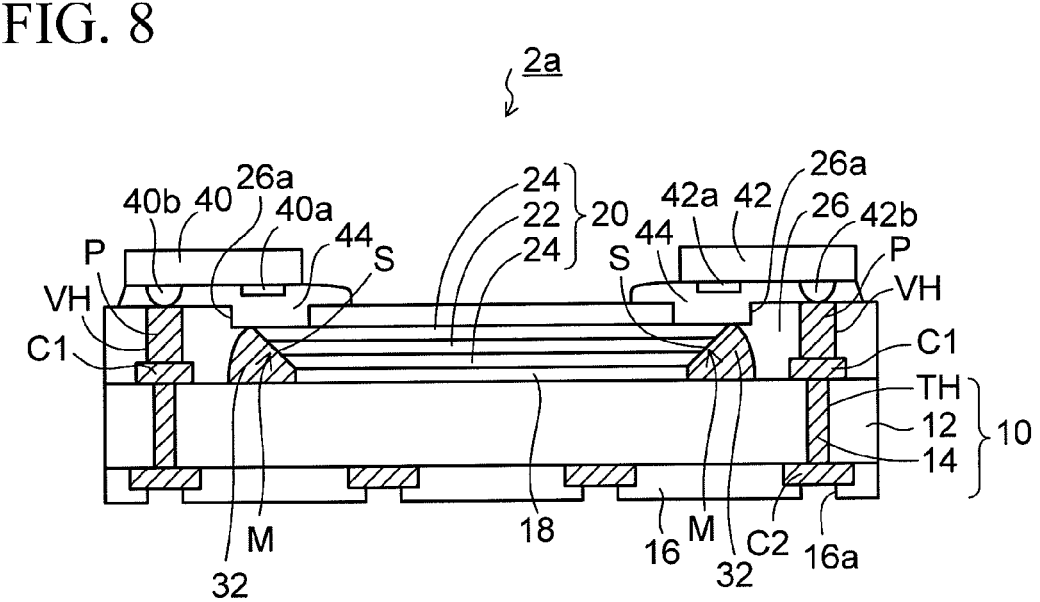
FIG. 8 is a sectional view depicting another optical waveguide device according to the second embodiment.

In FIG. 8, as depicted in a lower drawing of above FIG. 5B, another optical waveguide device 2a using the metal paste layer 32 as the light path conversion mirror M is illustrated.

As depicted in FIG. 8, in the optical waveguide device 2a, the metal paste layer 32 is formed instead of the light reflective resin layer portion 30x in the optical waveguide device 2 in FIG. 7. The metal paste layer 32 is formed partially only on the side surface of the light path conversion inclined surface S on both ends of the optical waveguide 20 to contact the light path conversion inclined surface S. Other elements of the optical waveguide device 2a in FIG. 8 are similar to those of the optical waveguide device 2 in FIG. 7.

The optical waveguide devices 2, 2a of the second embodiment can achieve the similar advantages to those in the optical waveguide device 1 of the first embodiment. In addition to this, in the second embodiment, the light reflective resin layer portion 30x or the metal paste layer 32 is formed partially only on the side surface of the light path conversion inclined surface S on both ends of the optical waveguide 20 to constitute the light path conversion mirror M.

By this matter, even when the light reflective resin is expensive, the solder resist 26 which is relatively inexpensive can be used in other portions. Therefore, a reduction in cost can be attained more than the case where the light reflective resin is formed over the whole surface of the wiring substrate 10. Also, in the case that the metal paste layer 32 is used, since the metal paste layer 32 may be formed only on the parts where the light path conversion mirror M is arranged, a reduction in cost can be attained similarly.

(Third Embodiment)

FIGS. 9A to 9C and FIG. 10 are sectional views depicting a method of manufacturing an optical waveguide device according to a third embodiment. A feature of the third embodiment resides in that the light reflective resin layer is utilized not only as the light path conversion mirror but also as the adhesive agent which is used to bond the optical waveguide to the wiring substrate.

In the third embodiment, the same reference symbols are affixed to the same steps and the same elements as those in the first embodiment, and their explanation will be omitted herein.

Figure 9A:
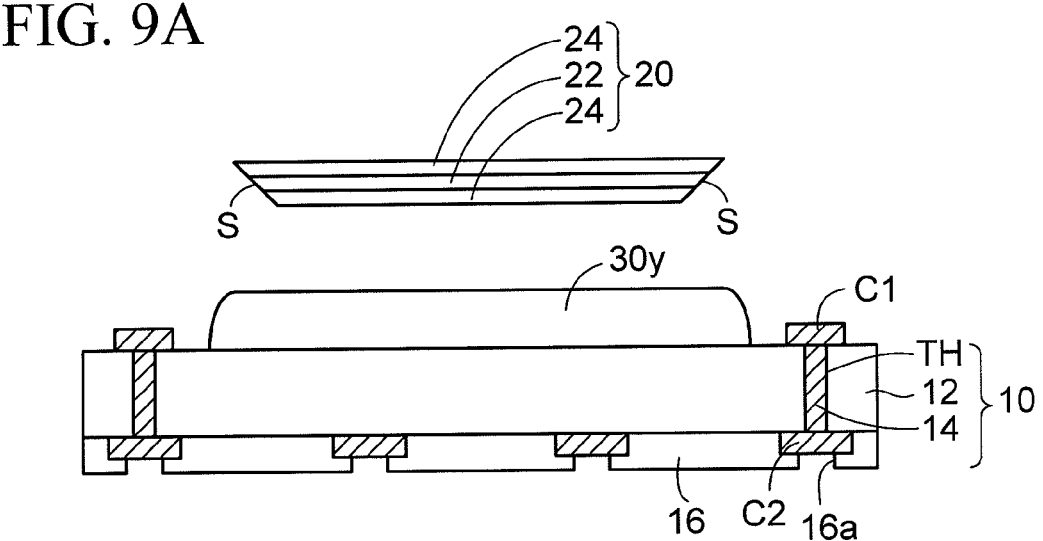
FIGS. 9A to 9C are sectional views depicting a method of manufacturing an optical waveguide device according to a third embodiment.

As depicted in FIG. 9A, like FIG. 1A in the first embodiment, the wiring substrate 10 onto which the optical waveguide 20 is bonded is prepared. Then, a liquid light reflective resin material 30y is formed in the area, which corresponds to the whole area of the optical waveguide 20, on the wiring substrate 10 by the screen printing, or the like. Then, the light reflective resin material 30y is brought into a semi-cured state by applying the pre-curing.

Figure 9B:
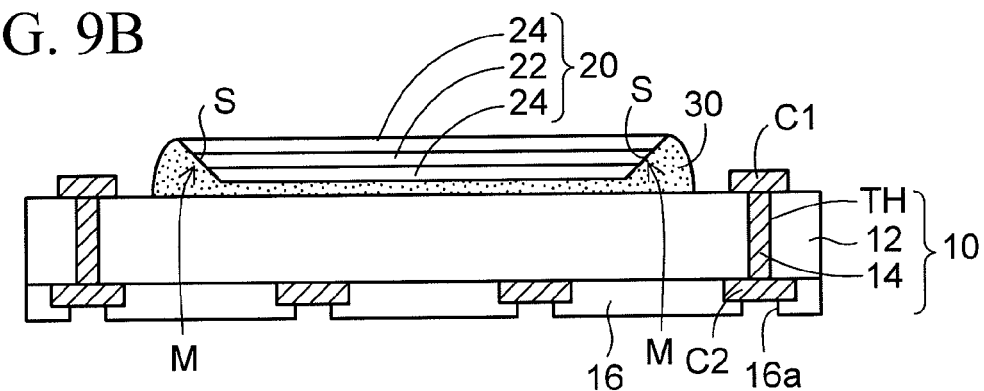

Then, as depicted in FIG. 9B, the optical waveguide 20 is pressed into the light reflective resin material 30y such that the light reflective resin material 30y of the semi-cured state contacts the light path conversion inclined surface S on both ends of the optical waveguide 20. Then, the light reflective resin material 30y of a semi-cured state is cured by applying the main curing, and thus the light reflective resin layer 30 is obtained.

At this time, the light reflective resin layer 30 located under the optical waveguide 20 functions as the adhesive agent which bonds the optical waveguide 20 to the wiring substrate 10 in the step of curing. Then, the light reflective resin layer 30 which contacts the light path conversion inclined surface S on both ends of the optical waveguide 20 functions as the light path conversion mirror M respectively.

In the third embodiment, the light reflective resin layer 30 can also be formed easily by the resin screen printing machine which is already equipped in the common mounting line, or the like.

Figure 9C:
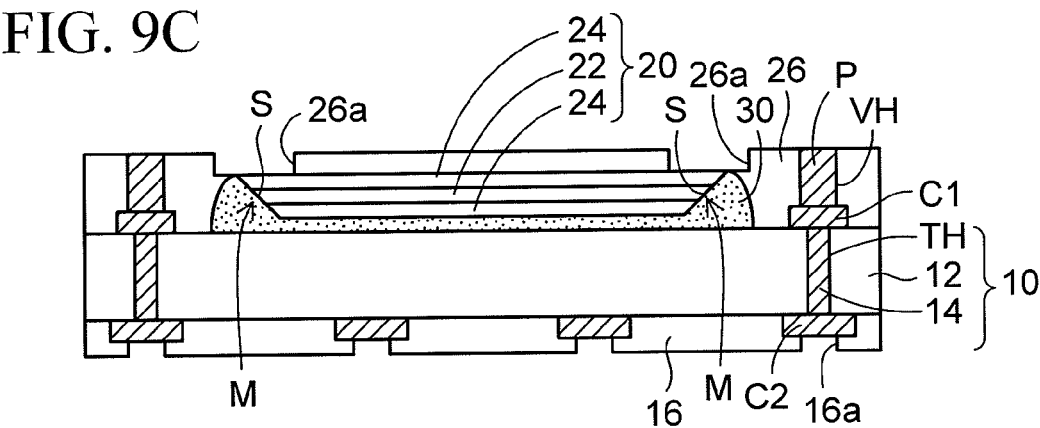

Then, as depicted in FIG. 9C, the solder resist 26 (insulating resin layer) is formed by the same method as the second embodiment. In the solder resist 26, the via holes VH each reaches the upper connection pad C1 on both end sides of the wiring substrate 10 and the light transmitting opening portion 26a arranged over the light path conversion inclined surface S are provided. Then, the electrode pad P like a post is formed in the via holes VH in the solder resist 26 by the same method as the first embodiment.

Figure 10:
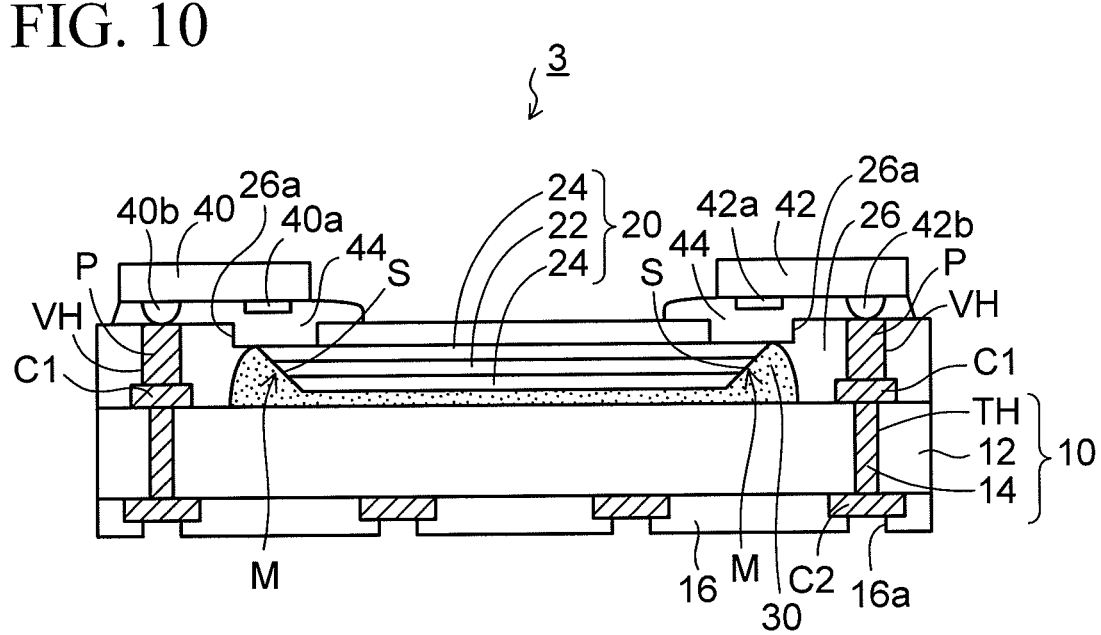
FIG. 10 is a sectional view depicting an optical waveguide device according to the third embodiment.

Then, as depicted in FIG. 10, like the first embodiment, the connection terminal 40b of the light emitting element 40 which is optically coupled to the light path conversion inclined surface S on one end side of the optical waveguide 20 is connected to the electrode pad P on one end side of the wiring substrate 10. Also, the connection terminal 42b of the light receiving element 42 which is optically coupled to the light path conversion inclined surface S on the other end side of the optical waveguide 20 is connected to the electrode pad P on the other end side of the wiring substrate 10.

Then, the underfill resin 44 is filled into the clearances located under the light emitting element 40 and the light receiving element 42 respectively.

With the above, an optical waveguide device 3 of the third embodiment can be obtained.

As depicted in FIG. 10, in the optical waveguide device 3 of the third embodiment, the optical waveguide 20 is bonded onto the wiring substrate 10 by the light reflective resin layer 30 which functions as the adhesive agent. The light reflective resin layer 30 is formed to extend from the lower side of the optical waveguide 20 to the side of the light path conversion inclined surface S located on both ends. The light reflective resin layer 30 formed on both ends of the optical waveguide 20 contacts the light path conversion inclined surface S of the optical waveguide 20, and functions as the light path conversion mirror M respectively.

Other configurations of the optical waveguide device 3 in FIG. 10 are similar to those of the optical waveguide device 2 (FIG. 7) in the second embodiment.

The optical waveguide device 3 in the third embodiment can achieve the similar advantages to those of the optical waveguide devices 1, 2 of the first and second embodiments. Also, in the third embodiment, the adhesive agent 18 for bonding the optical waveguide 20 to the wiring substrate 10 is not used, and the light reflective resin layer 30 is also used as the adhesive agent. As a result, the steps can be simplified more than the first and second embodiments, and a further reduction in cost can be achieved.

(Fourth Embodiment)

FIGS. 11A to 11C and FIG. 12 are sectional views depicting a method of manufacturing an optical waveguide device according to a fourth embodiment. A feature of the fourth embodiment resides in that the metal paste layer is utilized not only as the light path conversion mirror but also as the adhesive agent which bonds the optical waveguide to the wiring substrate. In the fourth embodiment, the same reference symbols are affixed to the same steps and the same elements as those in the first embodiment, and their explanation will be omitted herein.

Figure 11A:
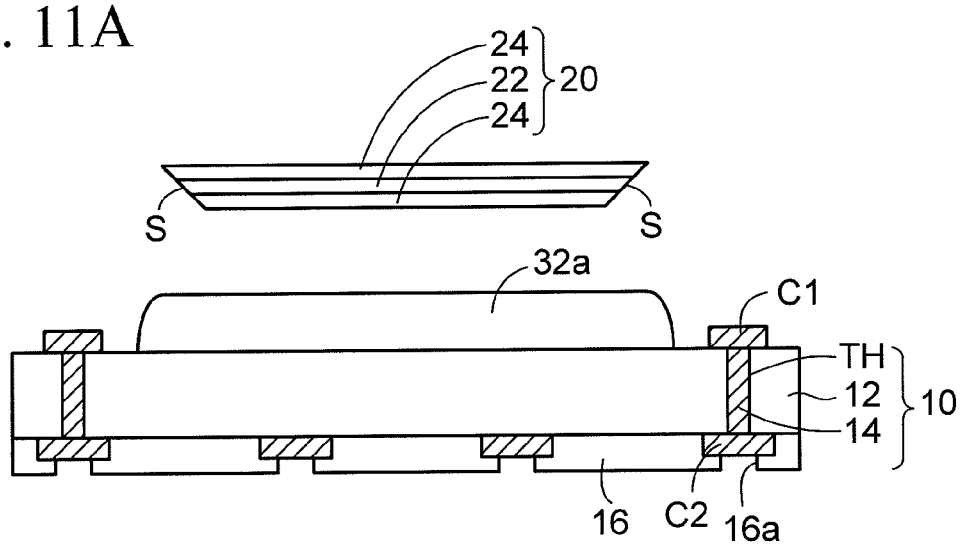
FIGS. 11A to 11C are sectional views depicting a method of manufacturing an optical waveguide device according to a fourth embodiment.

As depicted in FIG. 11A, like FIG. 1B in the first embodiment, the wiring substrate 10 to which the optical waveguide 20 is to be bonded is prepared. Then, a metal paste material 32a such as a silver paste, or the like is formed in the area, which corresponds to the whole area of optical waveguide 20 on the wiring substrate 10, by the screen printing, or the like.

Figure 11B:
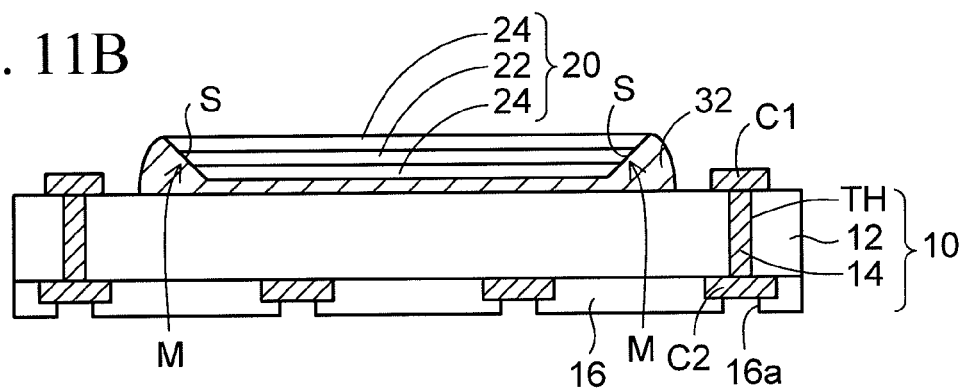

Then, as depicted in FIG. 11B, the optical waveguide 20 is pressed into the metal paste material 32a such that the metal paste material 32a contacts the light path conversion inclined surface S of the optical waveguide 20. Then, the metal paste layer 32 is obtained by curing the metal paste material 32a by means of sintering.

At this time, the metal paste material 32a located under the optical waveguide 20 functions as the adhesive agent, which bonds the optical waveguide 20 to the wiring substrate 10, in the step of curing. Then, the metal paste layer 32 which contacts the light path conversion inclined surface S on both sides of the optical waveguide 20 functions as the light path conversion mirror M respectively.

In the fourth embodiment, the metal paste layer 32 can be formed easily by the screen printing machine which is already equipped in the common mounting line, or the like, for forming a silver paste, or the like.

Figure 11C:
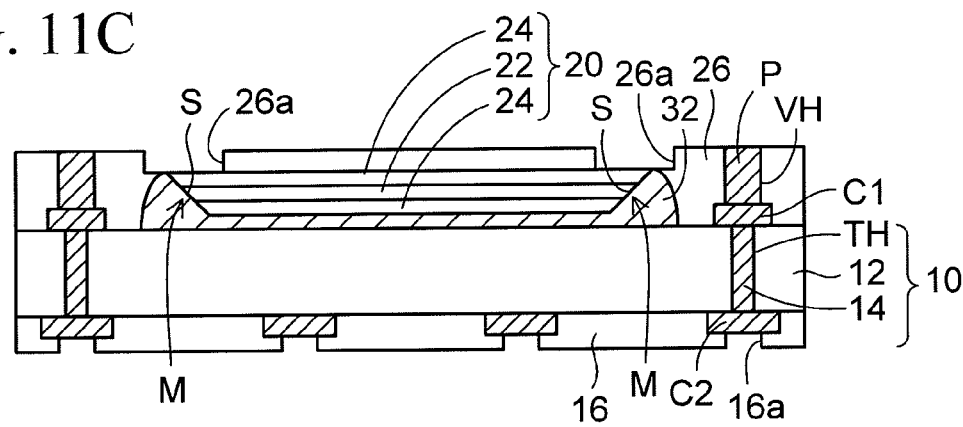

Then, as depicted in FIG. 11C, the solder resist 26 (insulating resin layer) is formed by the similar method to the second embodiment. In the solder resist 26, the via holes VH each reaches the upper connection pad C1 of the wiring substrate 10 and the light transmitting opening portion 26a arranged over the light path conversion inclined surface S are provided.

Then, the electrode pad P like a post is formed in the via holes VH in the solder resist 26 by the similar method to the first embodiment.

Figure 12:
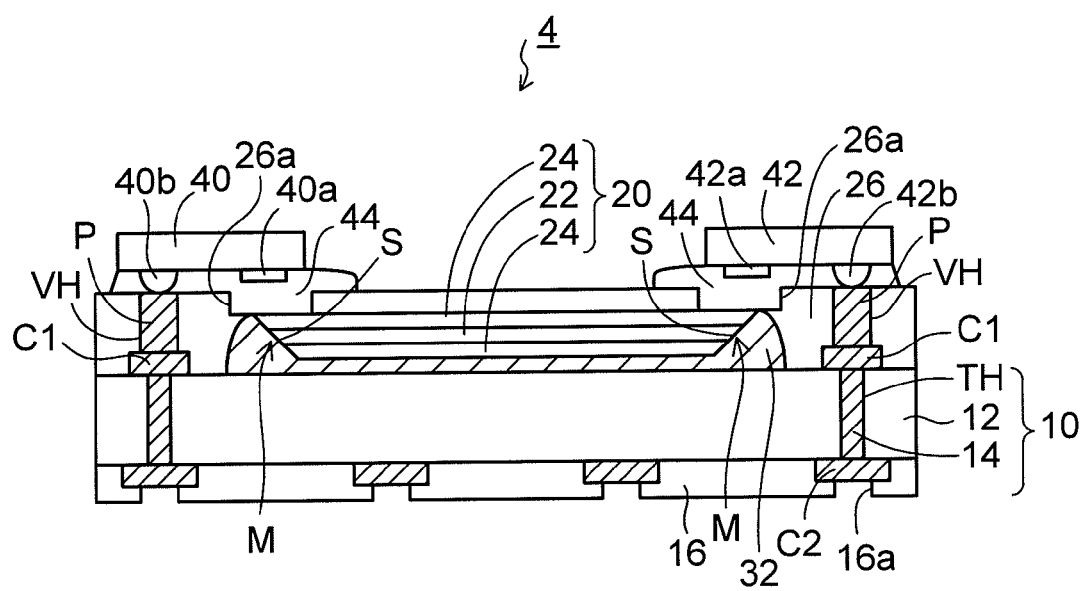
FIG. 12 is a sectional view depicting an optical waveguide device according to the fourth embodiment.

Then, as depicted in FIG. 12, like the first embodiment, the connection terminal 40b of the light emitting element 40, which is optically coupled to the light path conversion inclined surface S on one end side of the optical waveguide 20, is connected to the electrode pad P on one end side of the wiring substrate 10. Also, the connection terminal 42b of the light receiving element 42, which is optically coupled to the light path conversion inclined surface S on the other end side of the optical waveguide 20, is connected to the electrode pad P on the other end side of the wiring substrate 10.

Then, the underfill resin 44 is filled into the clearances located under the light emitting element 40 and the light receiving element 42 respectively.

With the above, an optical waveguide device 4 of the fourth embodiment can be obtained.

As depicted in FIG. 12, in the optical waveguide device 4 of the fourth embodiment, the optical waveguide 20 is bonded onto the wiring substrate 10 by the metal paste layer 32 which functions as the adhesive agent. The metal paste layer 32 is formed to extend from the lower side of the optical waveguide 20 to the side of the light path conversion inclined surface S on both ends. Also, the metal paste layer 32 which contacts the light path conversion inclined surface S of the optical waveguide 20 functions as the light path conversion mirror M.

Other elements of the optical waveguide device 4 in FIG. 12 are similar to those of the optical waveguide device 2 (FIG. 7) in the second embodiment.

The optical waveguide device 3 in the fourth embodiment can achieve the similar advantages to those of the optical waveguide devices 1, 2 of the first and second embodiments. Also, in the fourth embodiment, the adhesive agent 18 for bonding the optical waveguide 20 to the wiring substrate 10 is not used, and the metal paste layer 32 is also used as the adhesive agent. As a result, the steps can be simplified more than the optical waveguide device 2a (FIG. 8) in the second embodiment, and a further reduction in cost can be achieved.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relates to a showing of the superiority and interiority of the invention. Although the embodiments of the present invention have been described in detail, it should be understood that the various changes, substitutions, and alterations could be made hereto without departing from the spirit and scope of the invention.

What is claimed is:

1. An optical waveguide device, comprising:
a wiring substrate;
an optical waveguide bonded on the wiring substrate, and having a light path conversion inclined surface on both ends, wherein the light path conversion inclined surface is inclined from an upper edge of the optical waveguide toward an inside of the optical waveguide, and
a light path conversion mirror filled in a whole of an area between the light path conversion inclined surface of the optical waveguide and an upper surface of the wiring substrate, and formed on a side of the light path conversion inclined surface, and formed of only a metal paste layer which is made of a resin and metal particles,
wherein the metal paste layer directly contacts a whole of the light path conversion inclined surface with no clearance, and only a single material made of the metal paste layer is arranged between the light path conversion inclined surface of the optical waveguide and the wiring substrate, and
wherein the optical waveguide is bonded to the wiring substrate by the light path conversion mirror and the light path conversion mirror functions also as an adhesive agent which bonds the optical waveguide and the wiring substrate.

* * * * *